United States Patent [19]

Krude

[11] 4,383,588
[45] May 17, 1983

[54] VEHICLE WHEEL MOUNTING ASSEMBLY

[75] Inventor: Werner Krude, Siegburg-Kaldauen, Fed. Rep. of Germany

[73] Assignee: Uni-Cardan Aktiengesellschaft, Siegburg, Fed. Rep. of Germany

[21] Appl. No.: 238,447

[22] Filed: Feb. 26, 1981

[30] Foreign Application Priority Data

Mar. 20, 1980 [DE] Fed. Rep. of Germany ....... 3010726

[51] Int. Cl.$^3$ .......................................... B60K 17/030
[52] U.S. Cl. ...................................... 180/70 R; 180/259; 308/189 R; 308/236
[58] Field of Search ............ 180/70, 259, 73 C, 73 D, 180/73 R, 74, 75; 308/189 R, 236

[56] References Cited

U.S. PATENT DOCUMENTS 4,300,651 11/1981 Krude ........................... 180/70 R X

FOREIGN PATENT DOCUMENTS 2903229 of 0000 Fed. Rep. of Germany .

Primary Examiner—Joseph F. Peters, Jr.
Assistant Examiner—Mitchell J. Hill
Attorney, Agent, or Firm—Toren, McGeady and Stanger

[57] ABSTRACT

A vehicle wheel mounting assembly having a rotary joint and a wheel bearing is formed with an intermediate flange which is adatped to be clamped between the vehicle wheel and a wheel hub which threadedly receives the studs for mounting the wheel. An outer joint body of the wheel bearing is formed with an annular outer surface and an annular inner surface each of which extend with increasing diameters radially outwardly of the outer joint body. The wheel hub has a radially inwardly facing annular surface which conforms and cooperates with the annular outer surface of the outer joint body extension and the intermediate flange is formed on a side thereof facing the outer joint body with an outer surface which coincides and cooperates with the annular inner surface of the extension.

2 Claims, 1 Drawing Figure

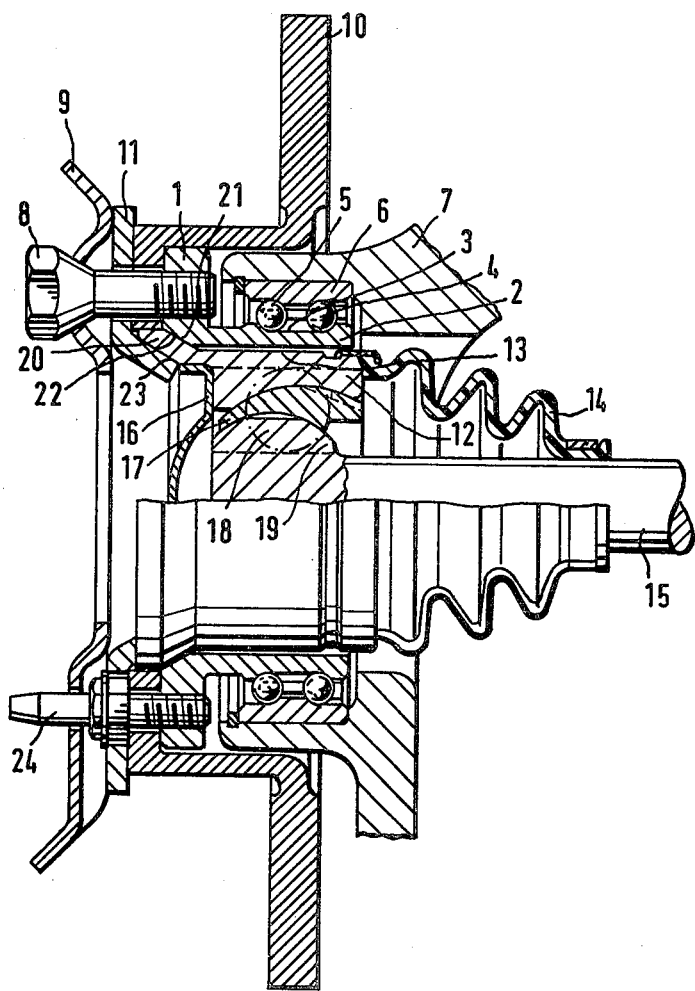

VEHICLE WHEEL MOUNTING ASSEMBLY

The present invention relates generally to mounting assemblies for vehicle wheels and more particularly to an assembly wherein the wheel is mounted by means of a rotary CV joint and a wheel bearing.

In assemblies of the type to which the present invention relates, the wheel bearing has an outer bearing ring which is fixed with the wheel carrier or vehicle and an inner bearing ring which is nonrotatably connected with a wheel hub which has threaded holes for receiving wheel studs for mounting the wheel. An intermediate flange is provided which is clamped between the wheel hub and the vehicle wheel, the intermediate flange being provided with apertures for receiving the wheel studs and being connected with a brake disc of the assembly. The rotary joint includes an outer joint body having its outer circumference received in an opening of the inner bearing ring with the outer joint body having on a side thereof proximate the vehicle wheel an extension with an annular outer face which extends with increasing diameter from the outer circumference of the outer joint body.

In the prior art, a device for mounting a vehicle wheel is disclosed in U.S. Pat. No. 4,300,651 wherein provision is made for the outer joint body on the side facing the vehicle wheel to have an extension whose annular outer face, commencing from the outer circumference of the outer joint body, extends into a first area with increasing diameter and subsequently into a second area with decreasing diameter.

The present invention is directed toward providing a design for a wheel mounting assembly such that a simple connecting means may be provided for the rotary CV joint wherein insufficient tightening of the wheel studs may be promptly recognized.

SUMMARY OF THE INVENTION

Briefly, the present invention may be described as a wheel mounting assembly of the type previously discussed wherein the extension of the outer joint body is formed with an inner face which extends with an increasing diameter from the side thereof facing the outer joint body, wherein the wheel hub is formed with a radially inwardly facing annular surface extending in accordance with the annular outer face of the outer joint body and wherein the intermediate flange, on the side facing the outer joint body, is formed with an outer face corresponding to the inner face of the extension.

The aforementioned assembly structured in accordance with the invention ensures trouble-free functioning, even if the outer joint body is of a simple design. As a result of the design of the extension, torque is transferred from the wheel hub to the outer joint body when the wheel studs are in a tightened condition. Only when the wheel studs are insufficiently tightened is it impossible to start the vehicle as then the outer joint body spins without eliminating the effect of the brake. In addition, production is easier since the extension is pressed against the wheel hub through an intermediate flange so that friction locking is ensured even if tolerances are not correctly observed.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

DESCRIPTION OF THE DRAWING

The single FIGURE of drawing is a sectional view of a wheel mounting assembly having supporting bearings and a rotary CV joint as well as a brake disc for a vehicle wheel.

DETAILED DESCRIPTION OF THE PREFERRED EMBODIMENT

In the drawing, a motor vehicle wheel mounting assembly in accordance with the invention is shown as comprising a rotary CV joint which consists essentially of a wheel hub 1 produced as one part with an inner bearing ring 2. The inner bearing ring 2 has grooves 4 on its outer cylindrical face 3 for receiving rolling members 5. The inner bearing ring 2, the rolling members 5 and an outer bearing ring 6 form the wheel bearing.

The outer bearing ring 6 is affixed to a respective wheel carrier (not illustrated) by means of a flange 7. The wheel hub 1 is provided with stud holes into which wheel studs 8 may engage. The wheel studs 8 affix a vehicle wheel 9 by means of their intermediate flange 11.

A brake disc is held by pins or studs 24.

An outer joint body 12 of the rotary CV joint is received in a bore 13 of the inner bearing ring 2. The joint interior is sealed on one side by bellows 14 affixed to the outer face of the outer joint body 12 and to an intermediate shaft 15. On the other side, a sealing function is provided by a cap 16 which is pressed into a bore of the outer joint body 12.

The spherical interior of the outer joint body 12 contains a cage 17 which serves to support and guide balls 18 which are schematically illustrated in the drawing. The hollow interior of the cage 17 is guided on the outer face of an inner joint body 19.

The outer joint body 12 is provided with an extension 20 having an annular outer surface which is designed as a conical or frustoconical surface 21. Beginning from the outer face of the outer joint body 12, the extension 20 extends with an increasing diameter radially outwardly of the body 12. The wheel hub 1 is designed in conformity with the extension 20 in such a way that the hub 1 has an annular surface formed by a conical face 22 which cooperates with the conical face 21 of the outer joint body 12. By means of the intermediate flange 11, the brake disc 10 is arranged relative to an annular surface defined by a further conical surface 23 of the outer joint body 12 in such a manner that a frictional locking connection is formed and held by the studs should the vehicle wheel be removed.

The wheel studs 8 which are received in a threaded bore of the wheel hub 1 and which are guided in apertures of the intermediate flange 11 will ensure that when the wheel studs are tightened the conical faces 21 and 23 form a friction locking connection with the corresponding counter faces. Provided that the wheel studs 8 are correctly tightened, the frictional locking connection will ensure that torque is transferred from the intermediate shaft 15 through the rotary CV joint on to the vehicle wheels 9. In a case where incorrect assembly or insufficient tightening of the wheel studs 8 occurs, the transmission of torque between the hub member and the outer joint member will be interrupted thereby providing a safety feature in that the vehicle cannot be driven if the wheel is not secure. However, the brakes will continue to remain effective since the brake disc 10 is still secured to the hub member.

While a specific embodiment of the invention has been shown and described in detail to illustrate the application of the inventive principles, it will be understood that the invention may be embodied otherwise without departing from such principles.

What is claimed is:

1. An assembly for mounting a vehicle wheel on a vehicle including rotary joint means and wheel bearing means, said assembly comprising, in combination:

an outer bearing ring of said wheel bearing means affixed with said vehicle;

an inner bearing ring of said wheel bearing means which has nonrotatably connected thereto a wheel hub having threaded holes for receiving studs for mounting said vehicle wheel upon said hub;

an intermediate flange located to be clamped between said wheel hub and said vehicle wheel, said intermediate flange being provided with apertures for receiving said studs and being connected with a brake disc of said assembly;

an outer joint body of said rotary joint means having an outer circumference which is received in an opening of said inner bearing ring;

said outer joint body having on a side thereof proximate said vehicle wheel an extension formed with an annular outer surface which extends radially from the outermost circumference of said outer joint body with an increasing diameter and an annular inner surface which extends radially with an increasing diameter from a side thereof closest to said outer joint body;

said wheel hub having a radially inwardly facing annular surface which extends coincidentally with said annular outer surface of said outer joint body;

said intermediate flange having on a side thereof facing said outer joint body an annular outer surface extending coincidentally with said annular inner surface of said extension.

2. An assembly according to claim 1 wherein said annular outer surface and said annular inner surface of said extension, said radially inwardly facing annular surface of said wheel hub and said annular outer surface of said intermediate flange are each formed as frustoconical surfaces.

* * * * *